United States Patent
Choudhary et al.

(10) Patent No.: US 9,513,017 B2
(45) Date of Patent: Dec. 6, 2016

(54) INSULATION CONFIGURATION FOR THERMAL APPLIANCES

(71) Applicant: Owens Corning Intellectual Capital, LLC, Toledo, OH (US)

(72) Inventors: Manoj K. Choudhary, Reynoldsburg, OH (US); Francis S. Tyler, Westerville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 14/852,894

(22) Filed: Sep. 14, 2015

(65) Prior Publication Data

US 2015/0377494 A1    Dec. 31, 2015

Related U.S. Application Data

(62) Division of application No. 13/789,766, filed on Mar. 8, 2013, now Pat. No. 9,175,863, which is a division of application No. 11/784,628, filed on Apr. 9, 2007, now Pat. No. 8,402,961.

(51) Int. Cl.
*F24C 15/34* (2006.01)
*F24H 9/00* (2006.01)
*F16L 59/08* (2006.01)

(52) U.S. Cl.
CPC ............ *F24C 15/34* (2013.01); *F16L 59/08* (2013.01); *F24H 9/0005* (2013.01)

(58) Field of Classification Search
CPC .......... F24H 9/0005; F24C 15/34; F16L 59/08
See application file for complete search history.

(56) References Cited

U.S. PATENT DOCUMENTS

| | | |
|---|---|---|
| 1,298,358 A | 3/1919 | Kun |
| 1,371,057 A | 3/1921 | Russell |
| 1,375,801 A | 4/1921 | Ross |
| 3,121,158 A | 2/1964 | Hurko |
| 3,342,967 A | 9/1967 | Kielberg |
| 3,507,265 A | 4/1970 | Hurko et al. |
| 3,606,066 A | 9/1971 | Anderson |
| 3,624,743 A | 11/1971 | Dills |
| 3,692,015 A | 9/1972 | Chase et al. |

(Continued)

FOREIGN PATENT DOCUMENTS

| | | |
|---|---|---|
| EP | 452279 | 10/1991 |
| WO | 2012/012539 | 1/2012 |

OTHER PUBLICATIONS

International Search Report and Written Opinion from PCT/US11/44692 dated Nov. 3, 2011.

(Continued)

*Primary Examiner* — Alfred Basichas
(74) *Attorney, Agent, or Firm* — Calfee, Halter & Griswold LLP

(57) ABSTRACT

An insulation system for a thermal oven. The insulation system comprises a cabinet and a liner positioned within the cabinet. The liner defines an oven cavity. The liner includes opposing sides, a top, a bottom, a front and a back. A layer of insulation is positioned between the cabinet and the outside of the opposing sides, top, bottom and back of the liner. The layer of insulation is positioned to create an air gap between the insulation and the opposing sides, top, bottom and back of the liner. The insulation has a thermal energy reflective facing attached to an interior surface facing the liner.

17 Claims, 6 Drawing Sheets

(56) References Cited

U.S. PATENT DOCUMENTS

| | | |
|---|---|---|
| 3,782,360 A | 1/1974 | Brucken |
| 3,861,378 A | 1/1975 | Rhoads et al. |
| 4,048,978 A | 9/1977 | Plumat et al. |
| 4,475,989 A | 10/1984 | Cain et al. |
| 4,967,487 A | 11/1990 | Urquhart |
| 4,985,106 A | 1/1991 | Nelson |
| 5,044,705 A | 9/1991 | Nelson |
| 5,231,814 A | 8/1993 | Hageman |
| 5,503,172 A | 4/1996 | Hedeen et al. |
| 6,141,930 A | 11/2000 | Allwein et al. |
| 6,337,143 B1 | 1/2002 | Ragland et al. |
| 6,586,111 B2 | 7/2003 | Ragland et al. |
| 6,666,044 B2 | 12/2003 | Gagnon |
| 6,758,206 B1 | 7/2004 | Barnes et al. |
| 6,761,159 B1 | 7/2004 | Barnes et al. |
| 6,767,659 B1 | 7/2004 | Campbell |
| 6,797,653 B2 | 9/2004 | Fay |
| 7,299,652 B2 | 11/2007 | Gagnon |
| 9,175,863 B2 | 11/2015 | Choudhary et al. |
| 2002/0182347 A1 | 12/2002 | DeBraal et al. |
| 2005/0160711 A1 | 7/2005 | Yang |
| 2006/0032266 A1 | 2/2006 | Gagnon |
| 2006/0154115 A1 | 7/2006 | Fellinger et al. |
| 2006/0201493 A1 | 9/2006 | Chacko et al. |
| 2007/0014995 A1 | 1/2007 | Chacko et al. |
| 2008/0246379 A1 | 10/2008 | Choudhary et al. |
| 2008/0248303 A1 | 10/2008 | Maurer |
| 2008/0280131 A1 | 11/2008 | Chacko et al. |
| 2012/0017883 A1 | 1/2012 | Campen |

OTHER PUBLICATIONS

Office action from U.S. Appl. No. 13/187,036 dated Jan. 3, 2013.
Office action from U.S. Appl. No. 11/784,628 dated Apr. 16, 2009.
Office action from U.S. Appl. No. 11/784,628 dated Oct. 21, 2009.
Office action from U.S. Appl. No. 11/784,628 dated Feb. 8, 2010.
Interview Summary from U.S. Appl. No. 11/784,628 dated Apr. 27, 2010.
Office action from U.S. Appl. No. 11/784,628 dated Jul. 14, 2010.
Advisory Action from U.S. Appl. No. 11/784,628 dated Oct. 27, 2010.
Office action from U.S. Appl. No. 11/784,628 dated Dec. 27, 2010.
Office action from U.S. Appl. No. 11/784,628 dated Jun. 10, 2011.
Advisory action from U.S. Appl. No. 11/784,628 dated Dec. 16, 2011.
Office action from U.S. Appl. No. 11/784,628 dated Mar. 29, 2012.
Office action from U.S. Appl. No. 11/784,628 dated Jul. 18, 2012.
Notice of Allowance from U.S. Appl. No. 11/784,628 dated Nov. 29, 2012.
Supplemental Notice of Allowability from U.S. Appl. No. 11/784,628 dated Dec. 11, 2012.
Office action from U.S. Appl. No. 13/187,036 dated Aug. 29, 2013.
Notice of Allowance from U.S. Appl. No. 13/789,766 dated Jul. 15, 2015.
Office action from U.S. Appl. No. 13/789,766 dated Mar. 27, 2015.
Office action from U.S. Appl. No. 13/789,766 dated Oct. 17, 2014.
Office action from U.S. Appl. No. 13/789,766 dated Jun. 23, 2014.
Office action from U.S. Appl. No. 13/789,766 dated Dec. 27, 2013.
Office action from U.S. Appl. No. 13/789,766 dated Jul. 2, 2013.

INSULATION CONFIGURATION FOR THERMAL APPLIANCES

CROSS REFERENCE TO RELATED APPLICATIONS

This application is a divisional application of U.S. Ser. No. 13/789,766, filed on Mar. 8, 2013, titled "Insulation Configuration for Thermal Appliances" which is a divisional application of U.S. Ser. No. 11/784,628, filed Apr. 9, 2007, titled "Insulation Configuration for Thermal Appliances", now U.S. Pat. No. 8,402,961, the entire disclosures of which are incorporated by reference in their entirety.

TECHNICAL FIELD

This invention relates generally to insulation for controlling the temperature of a heating appliance, such as a thermal oven or a thermal hot water heater, and more specifically relates to controlling the temperature of localized "hot spots" within the heating appliance.

BACKGROUND OF THE INVENTION

Thermal appliances, such as for example ovens and hot water heaters use high heat levels for various purposes, including food preparation, self-cleaning, and heating of water. The high heat levels are produced within a heating compartment or a heating tank, which is also the location of the food being prepared, or the interior surfaces being self-cleaned, or the water being heated. Various energy sources, including natural gas, electricity, and oil can be used to produce the high heat levels. The heating compartment or heating tank is typically positioned within a cabinet or a cylindrical enclosure. The cabinet or cylindrical enclosure typically includes side panels, a back panel, a top panel and a bottom panel. High temperature insulation can be positioned adjacent to the sides, top, back, and bottom of the heating compartment or heating tank. The high temperature insulation is used to control the flow of heat from the sides, top, and bottom of the heating compartment or heating tank to the outside of the enclosure or cabinet. The temperature within the heating compartment or heating tank during normal operation can reach up to 1600° F. (871° C.).

Numerous consumer safety codes have been enacted which relate to the maximum allowable external temperature of the enclosure or cabinet. Since some thermal appliances, such as thermal ovens, are typically positioned adjacent other fixtures, such as for example other appliances, or are built-in next to wood-based cabinets, the enclosure or cabinet can be in direct contact with these other fixtures.

It would be advantageous if the thermal appliances could include insulation configured to better control the flow of heat from heating compartment or heating tank to the outside of the enclosure or cabinet.

SUMMARY OF THE INVENTION

The above objects as well as other objects not specifically enumerated are achieved by an insulation system for a thermal oven. The insulation system comprises a cabinet and a liner positioned within the cabinet. The liner defines an oven cavity. The liner includes opposing sides, a top, a bottom, a front and a back. A layer of insulation is positioned between the cabinet and the outside of the opposing sides, top, bottom, front and back of the liner. The layer of insulation is positioned to create an air gap between the insulation and the opposing sides, top, bottom and back of the liner. The insulation has a thermal energy reflective facing attached to an interior surface facing the liner.

According to this invention there is also provided a method of insulating a thermal oven. The method comprises the steps of providing a cabinet, a liner is positioned within the cabinet, the liner defining an oven cavity, the liner including opposing sides, a top, a bottom, a front and a back, and positioning a layer of insulation between the cabinet and the outside of the opposing sides, top, bottom, front and back of the liner. The layer of insulation is positioned to create an air gap between the insulation and the opposing sides, top, bottom and back of the liner. The insulation has a thermal energy reflective facing attached to an interior surface facing the liner.

According to this invention there is also provided an insulation system for a thermal oven. The insulation system comprises a cabinet and a liner positioned within the cabinet. The liner defines an oven cavity. The liner includes opposing sides, a top, a bottom, a front and a back. An inner layer of insulation is positioned outside the sides, top, bottom and back of the liner. The inner layer of insulation is in contact with the liner. An outer layer of insulation is positioned outside the inner layer of insulation. The outer layer of insulation has a thermal energy reflective facing. The facing of the outer layer of insulation is in contact with the inner layer of insulation.

According to this invention there is also provided an insulation system for a thermal hot water heater. The insulation system comprising an outer case and a tank positioned within the outer case. The tank defines a heating cavity. The tank includes a top, a bottom, and a continuous wall. A layer of insulation is positioned between the outer case and the outside of the top, bottom and continuous wall of the tank. The layer of insulation is positioned to create an air gap between the insulation and the top, bottom and continuous wall of the tank. The insulation has a thermal energy reflective facing attached to the interior surface facing the liner.

According to this invention there is also provided an insulation system for a thermal hot water heater. The insulation system comprises an outer case and a tank positioned within the outer case. The tank defines a heating cavity. The tank includes a top, a bottom, and a continuous wall. An inner layer of insulation is positioned outside the top, bottom and continuous wall of the tank. The inner layer of insulation is in contact with the tank. An outer layer of insulation is positioned outside the inner layer of insulation. The outer layer of insulation has a thermal energy reflective facing. The facing of the outer layer of insulation is in contact with the inner layer of insulation.

Various objects and advantages of this invention will become apparent to those skilled in the art from the following detailed description of the invention, when read in light of the accompanying drawings.

DETAILED DESCRIPTION OF THE INVENTION

The description and drawings disclose an insulation system for thermal appliances. A thermal appliance is defined as an apparatus or structure for heating an object positioned within the oven. Various examples of thermal appliances include traditional residential ovens, commercial ovens, convection ovens, microwave ovens, hot water heaters or any other apparatus or structure sufficient to heat an object positioned within the oven.

Figure 1:
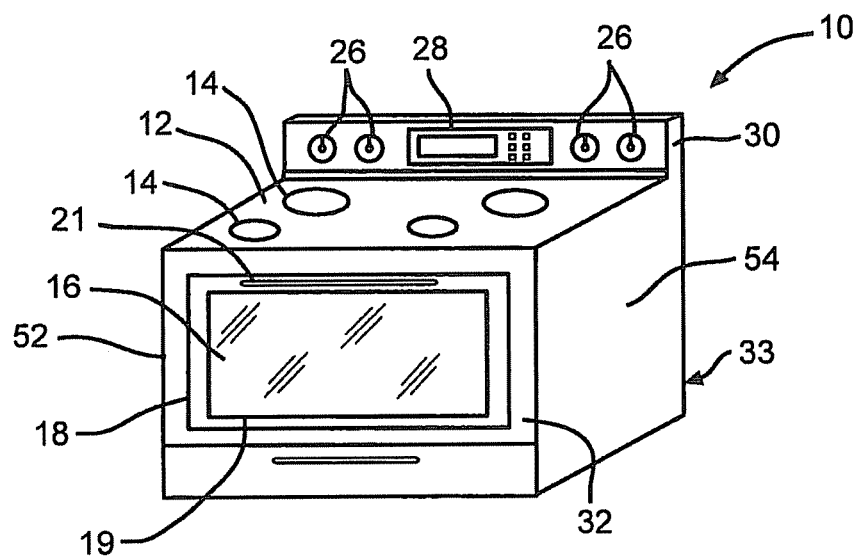
FIG. 1 is a perspective view of a thermal oven.

Referring now to the drawings, there is shown in FIG. 1 one example of a thermal appliance, namely a thermal oven 10. The thermal oven 10 includes a substantially flat, top cooking surface 12. A plurality of heating elements or burners 14 are typically positioned on the top cooking surface 12, although the heating elements or burners 14 are optional. The thermal oven 10 includes a plurality of controls 26 for the burners 14 on the cooking surface as well as a control panel 28 for controlling the temperature within an oven cavity 16. Typically, the controls 26 and control panel 28 are mounted on a backsplash 30. The backsplash 30 is located on a back edge of the cooking surface 12. The backsplash 30 typically extends away from, and substantially perpendicular to, the cooking surface 12.

Figure 2:
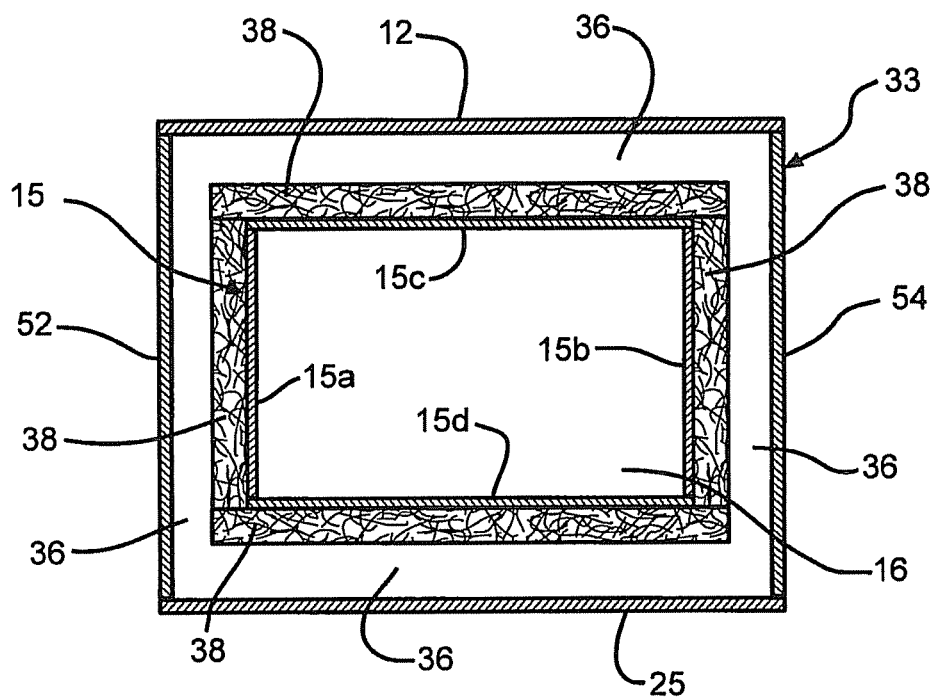
FIG. 2 is a cross-sectional front view in elevation of an oven cavity of a known cooking appliance.
Figure 3:
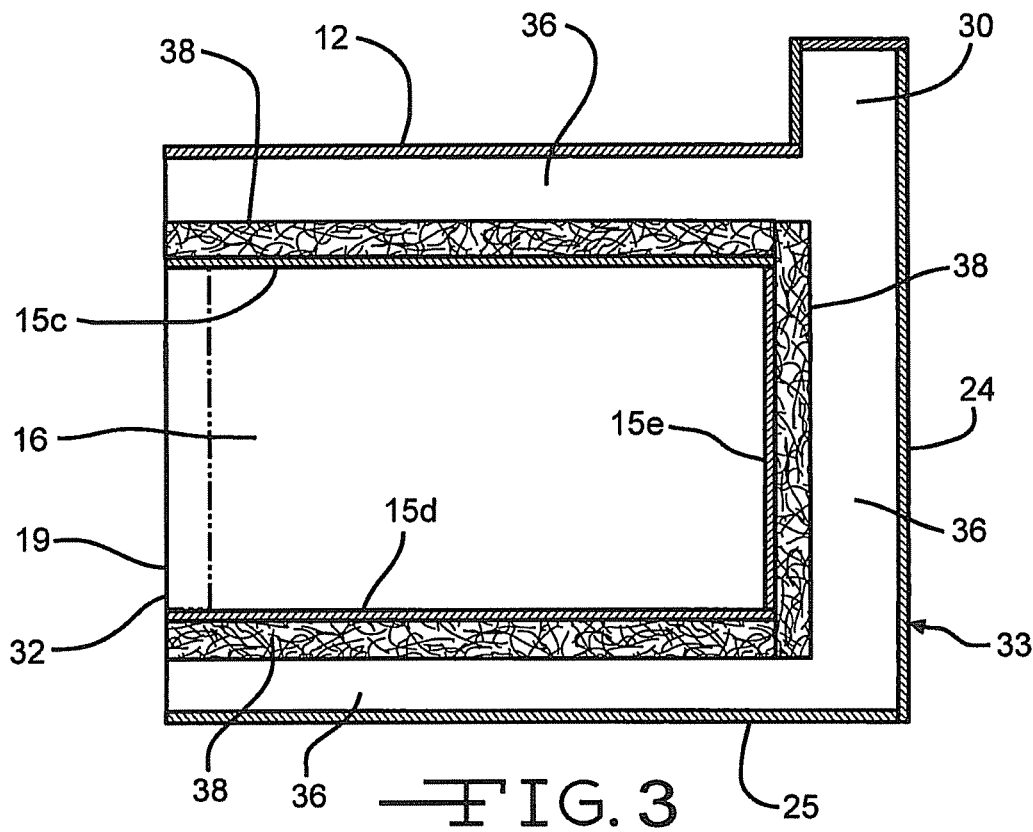
FIG. 3 is a cross-sectional side view in elevation of the oven cavity of the known cooking appliance of FIG. 2.

As shown in FIGS. 1-3, the thermal oven 10 includes a pair of opposed side panels 52 and 54, a back panel 24, a bottom panel 25, and a front panel 32. The opposed side panels 52 and 54, back panel 24, bottom panel 25, front panel 32 and cooking surface 12 are configured to form an outer oven cabinet 33. The outer oven cabinet 33 is typically finished with an aesthetically pleasing finish, such as for example a painted finish, a porcelain enamel finish or a brushed stainless steel finish, particularly for those panels that are exposed to view by consumers.

The front panel 32 includes an insulated oven door 18 pivotally connected to the front panel 32. The oven door 18 is hinged at a lower end to the front panel 32 such that the oven door can be pivoted away from the front panel 32 and the oven cavity 16. Optionally, the oven door 18 can include a window 19. The window 19 is typically made of glass, in order that the user can view the contents of the oven cavity 16 during its use. Also, the oven door 18 can include a handle 21 configured to facilitate moving the oven door 18 from an open position to a closed position and visa versa.

As shown in FIGS. 2 and 3, the outer oven cabinet 33 supports an inner oven liner 15. The inner oven liner 15 includes opposing liner sides 15a and 15b, a liner top 15c, a liner bottom 15d and a liner back 15e. The opposing liner sides 15a and 15b, liner top 15c, liner bottom 15d, liner back 15e and oven door 18 are configured to define the oven cavity 16.

As further shown in FIGS. 2 and 3, the exterior of the oven liner 15 is covered by insulation material 38. A typical insulation material 38 is fiberglass insulation, although other insulation material 38 can be used. The insulation material 38 typically has a density within the range from about 0.5 lbs/ft$^3$ (8 kg/m$^3$) to about 10.0 lbs/ft$^3$ (160 kg/m$^3$), and a thickness within the range from about 1.0 inches (2.54 cm) to about 3 inches (7.62 cm). The insulation material 38 is placed in contact with an outside surface of the oven liner 15. The insulation material 38 is used for many purposes, including retaining heat within the oven cavity 16 and limiting the amount of heat that is transferred by conduction, convection and radiation to the outer oven cabinet 33.

As shown in FIGS. 2 and 3, an air gap 36 is formed between the insulation material 38 and the outer oven cabinet 33. The air gap 36 is used as a further insulator to limit the conductive heat transfer between oven liner 15 and the outer oven cabinet 33. The use of the air gap 36 supplements the insulation material 38 to minimize the surface temperatures on the outer surfaces of the outer oven cabinet 33.

Figure 4:
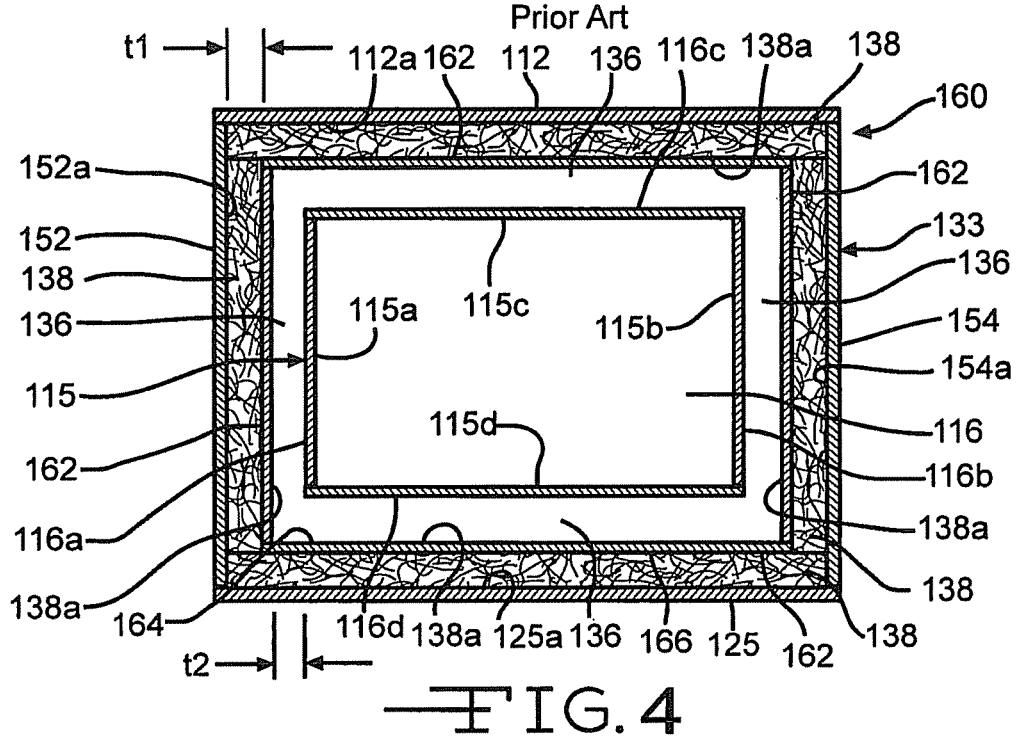
FIG. 4 is a cross-sectional front view in elevation of an improved thermal oven of FIG. 1.
Figure 5:
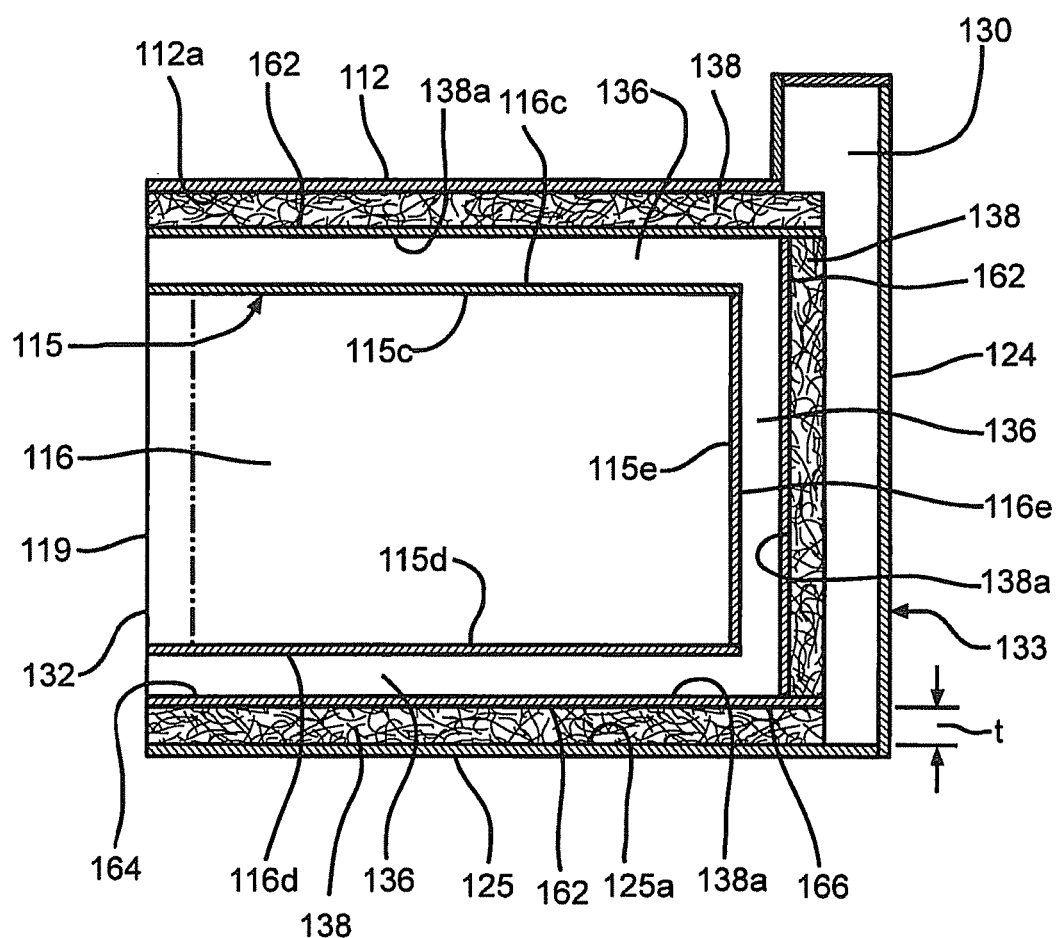
FIG. 5 is a cross-sectional side view in elevation of the improved thermal oven of FIG. 4.

Referring now to FIGS. 4 and 5, there is illustrated an improved thermal oven, indicated generally at 160. As will be explained in detail below, the thermal oven 160 includes an insulation material having a thermal energy reflective facing, wherein the positioning of the insulation material forms an air gap between the oven liner 115 and the facing of the insulation material.

As shown in FIGS. 4 and 5, the thermal oven 60 includes an oven liner 115. The inner oven liner 115 includes opposing liner sides 115a and 115b, a liner top 115c, a liner bottom 115d and a liner back 115e. The opposing liner sides 115a and 115b, liner top 115c, liner bottom 115d, liner back 115e and oven door 118 are configured to define the oven cavity 116. The opposing liner sides 115a and 115b have outer surfaces 116a and 116b respectfully. In a similar manner, the liner top 115c, the liner bottom 115d, and the liner back 115e have outer surfaces 116c, 116d, and 116e respectfully.

The oven liner 115 is supported by the outer oven cabinet 133. The outer oven cabinet 133 is formed from a pair of opposed side panels 152 and 154, a back panel 124, a bottom panel 125, a cooking surface 112 and a front panel 132. The opposed side panels 152 and 154 have interior surfaces 152a and 154a respectfully. In a similar manner, the bottom panel 125, the back panel 124, the cooking surface 112 have interior surfaces 125a, 124a and 112a respectfully.

As further shown in FIGS. 4 and 5, the thermal oven 160 includes a layer of fibrous insulation material 138. The fibrous insulation material 138 is positioned between the outer surfaces 116a, 116b, 116c, 116d and 116e of the opposing liner sides, liner top, liner bottom, and liner back, 115a, 115b, 115c, 115d and 115e and the interior surfaces 152a, 154a, 125a, 124a and 112a of the opposed side panels, back panel, bottom pane and cooking surface 152, 154, 125, 124 and 112 respectfully. In one embodiment, the fibrous insulation material 138 is made of glass fibers. Alternatively, the fibrous insulation material 138 can be another insulation material, such as for example mineral wool, rock wool, polymer fibers, sufficient to insulate the oven cavity 116. In one embodiment, the fibrous insulation material 138 is held in place by mechanical clips (not shown). In another embodiment, the fibrous insulation material 138 is held in place by brackets or any other mechanical fastener. In one embodiment, the fibrous insulation material 138 includes at least one layer of fibrous insulation such as glass fibers, mineral wool, rock wool, or polymer fibers. Alternatively, the fibrous insulation material 138 could include more than one layer of fibrous insulation. In the embodiment shown in FIGS. 4 and 5, the fibrous insulation material 138 has a thickness t1. The thickness t1 is in a range from about 0.50 inches (1.27 cm) to about 1.5 inches (3.81 cm). In another embodiment, the thickness a can be less than 0.50 inches (1.27 cm) or more than 1.5 inches (3.81 cm). In one embodiment, the fibrous insulation material 138 has a density in a range from about 1.0 lb/ft³ to about 15.0 lb/ft³. In another embodiment, the fibrous insulation material 138 can have a density less than 1.0 lb/ft³ or more than 15.0 lb/ft³.

As shown in FIGS. 4 and 5, the fibrous insulation material 138 includes a thermal energy reflective facing 162. In this embodiment, the facing 162 is a metallic foil. The metallic foil of the facing 162 is configured to reflect thermal energy. In one embodiment, the metallic foil of the facing 162 can be made of aluminum. In another embodiment, the metallic foil of the facing 162 can be made of another material, such as for example a metalized film, sufficient to reflect thermal energy. The metallic foil has a thickness in a range from about 0.008 inches (0.02 cm) to about 0.10 inches (0.254 cm). Alternatively, the metallic foil can have a thickness less than 0.008 inches (0.02 cm) or more than 0.10 inches (0.254 cm). In the embodiment shown in FIGS. 4 and 5, the facing 162 has an interior surface 164 and an outer surface 166. The interior surface 164 of the facing 162 has an emissivity rating below about 0.15. In another embodiment the interior surface of the facing 162 has an emissivity above or below 0.15. The outer surface 166 of the facing 162 can have any rating of emissivity.

As further shown in FIGS. 4 and 5, an air gap 136 is formed between the interior surface 164 of the facing 162 of the insulation material 138 and the oven liner 115. The air gap 136 is used as a further insulator to limit the conductive heat transfer between oven liner 115 and the outer oven cabinet 133. The use of the air gap 136 supplements the insulation material 138 to minimize the surface temperatures on the outer surfaces of the outer oven cabinet 133. As shown in FIGS. 4 and 5, the air gap 136 has a thickness t2. In this embodiment, the thickness t2 is in a range from about 0.50 inches (1.27 cm) to about 1.5 inches (3.81 cm). In another embodiment, the thickness t2 can be less than 0.50 inches (1.27 cm) or more than 1.5 inches (3.81 cm).

During normal cooking operation, the improved thermal oven 160 will heat the oven cavity 116 to a cooking temperature range from about 250° F. (121° C.) to about 500° F. (260° C.). When operating in a self-cleaning mode, the thermal oven 160 heats the oven cavity 116 to a temperature in a range from about 750° F. (398° C.) to about 900° F. (482° C.). For commercial or industrial thermal ovens, the temperature within the oven cavity 116 can reach as high as 1600° F. (871° C.). The heat from within the oven cavity 116 radiates from the oven cavity 116, through the air gap 136, and reflects against the thermal energy reflective facing 162 of the insulation material 138. In this manner, the air gap 136, the insulation material 138 and the facing 162 cooperate to limit the amount of heat that is transferred to the outer oven cabinet 133. Heat exposure tests, such as the UL858 Standard for Household Electric Ranges and ANSI Z21.1 Standard for Household Cooking Gas Appliances, require that the maximum allowable surface temperature be 152° F. for a painted metal surface, 160° F. for a porcelain enamel surface, or 172° F. for a glass surface. In addition to meeting the maximum requirements surface temperatures for heat exposure tests, the improved configuration of the air gap 136, the insulation material 138 and the facing 162 also provide for reduced power necessary for cooking and self-cleaning modes of operation, and protection of sensitive electronic controls from excessive exposure to high heat.

Figure 6:
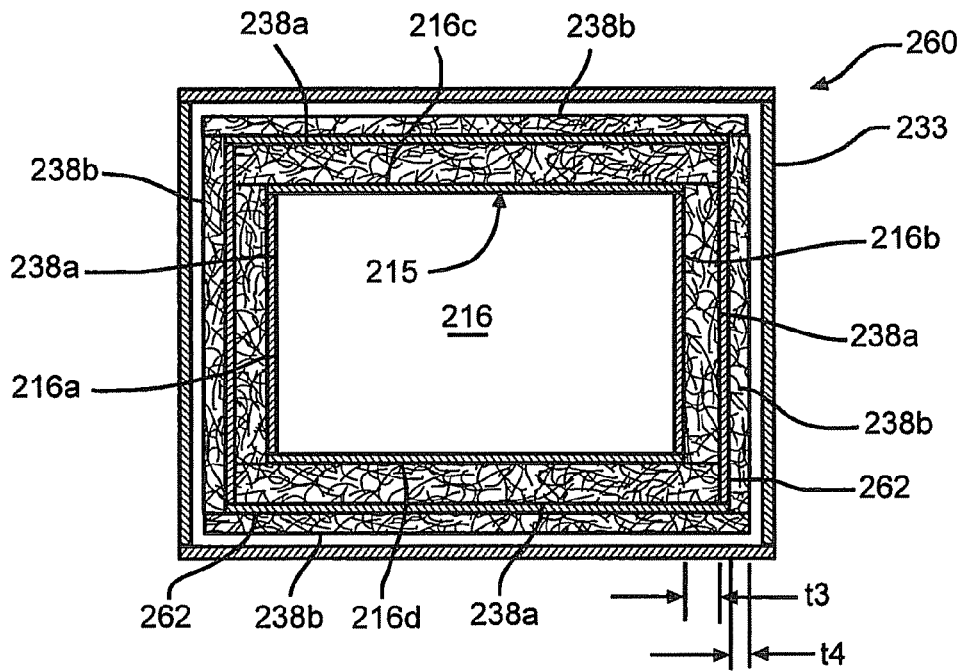
FIG. 6 is a cross-section front view in elevation of a second embodiment of the improved thermal oven.
Figure 7:
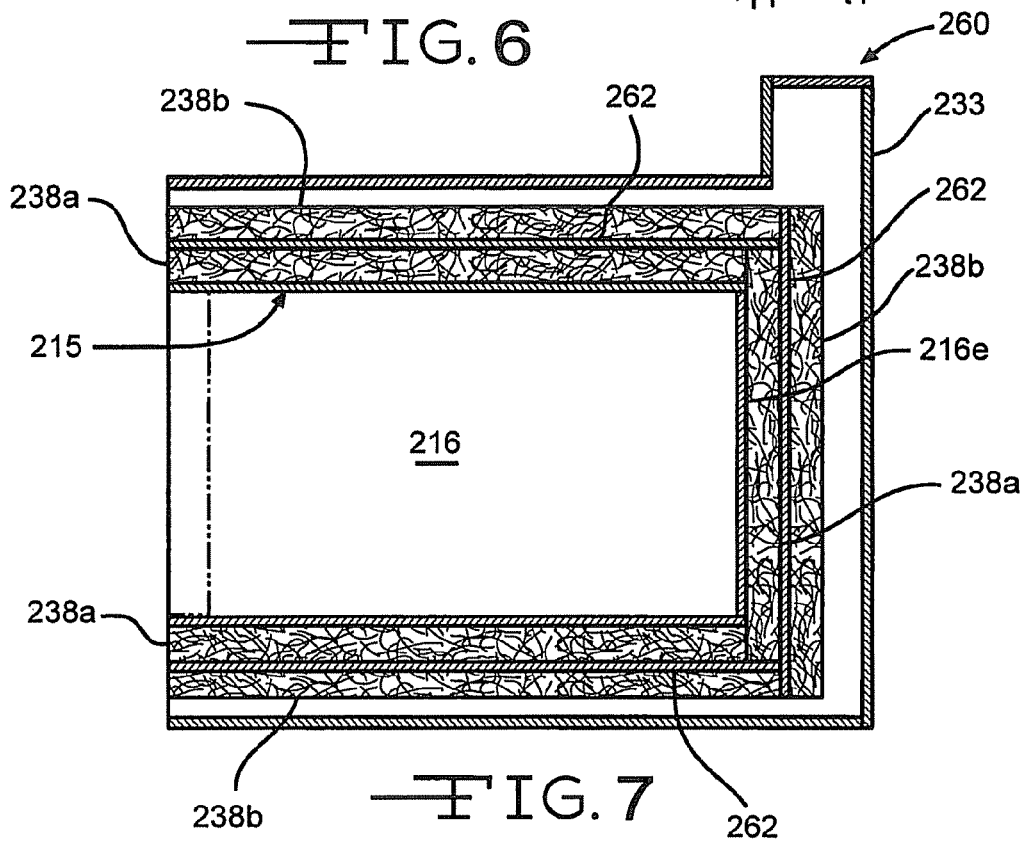
FIG. 7 is a cross-sectional side view in elevation of a second embodiment of the improved thermal oven of FIG. 6.

In another embodiment of the improved thermal oven 260, as shown in FIGS. 6 and 7, the air gap is eliminated and an inner insulation material 238a is positioned in contact with the outside surfaces 216a, 216b, 216c, 216d and 216e of the liner 215. In one embodiment, the inner insulation material 238a is low density insulation and is configured to replace the air gap with a semi-transparent thermal insulation. Alternatively, the inner insulation material 238a can be any insulation sufficient to provide thermal insulation. The inner insulation material 238a has a thickness t3. In one embodiment, the thickness t3 is in a range from about 0.50 inches (1.27 cm) to about 1.5 inches (3.81 cm). In another embodiment, the thickness t3 can be less than 0.50 inches (1.27 cm) or more than 1.5 inches (3.81 cm). An outer insulation material 238b is positioned adjacent to the inner insulation material 238a. In one embodiment, the outer insulation material 238b is a high density insulation and is configured to provide a predetermined level of thermal insulation. Alternatively, the outer insulation material 238b can be any insulation sufficient to provide a predetermined level of thermal insulation. The outer insulation material 238b has a thickness t4. In one embodiment, the thickness t4 is in a range from about 0.50 inches (1.27 cm) to about 1.5 inches (3.81 cm). In another embodiment, the thickness t3 can be less than 0.50 inches (1.27 cm) or more than 1.5 inches (3.81 cm).

In the embodiment shown in FIGS. 6 and 7, the inner insulation material 238a reduces convective heat transfer while having little of no effect on radiative heat transfer. The inner insulation material 238a is therefore typically a lower density than the outer insulation material 238b. The inner insulation material 238a is also typically more transparent to thermal radiation (in a range from about 0.1 micron to about 100 micron wavelength) than the outer insulation material 238b.

As further shown in FIGS. 6 and 7, the outer insulation 238b has a thermal energy reflective facing 262. The facing 262 is positioned between the inner insulation material 238a and the outer insulation material 238b. In this embodiment, the facing 262 is the same as the facing 62 described above.

During normal cooking operation, the improved thermal oven 260 will heat the oven cavity 216. The heat from within the oven cavity 216 radiates from the oven cavity 216, through the inner insulation material 238a, and reflects against the thermal energy reflective facing 262 of the outer insulation material 238b. In this manner, the inner insulation material 238a, the outer insulation material 238b and the facing 262 cooperate to limit the amount of heat that is transferred to the outer oven cabinet 233.

Figure 8:
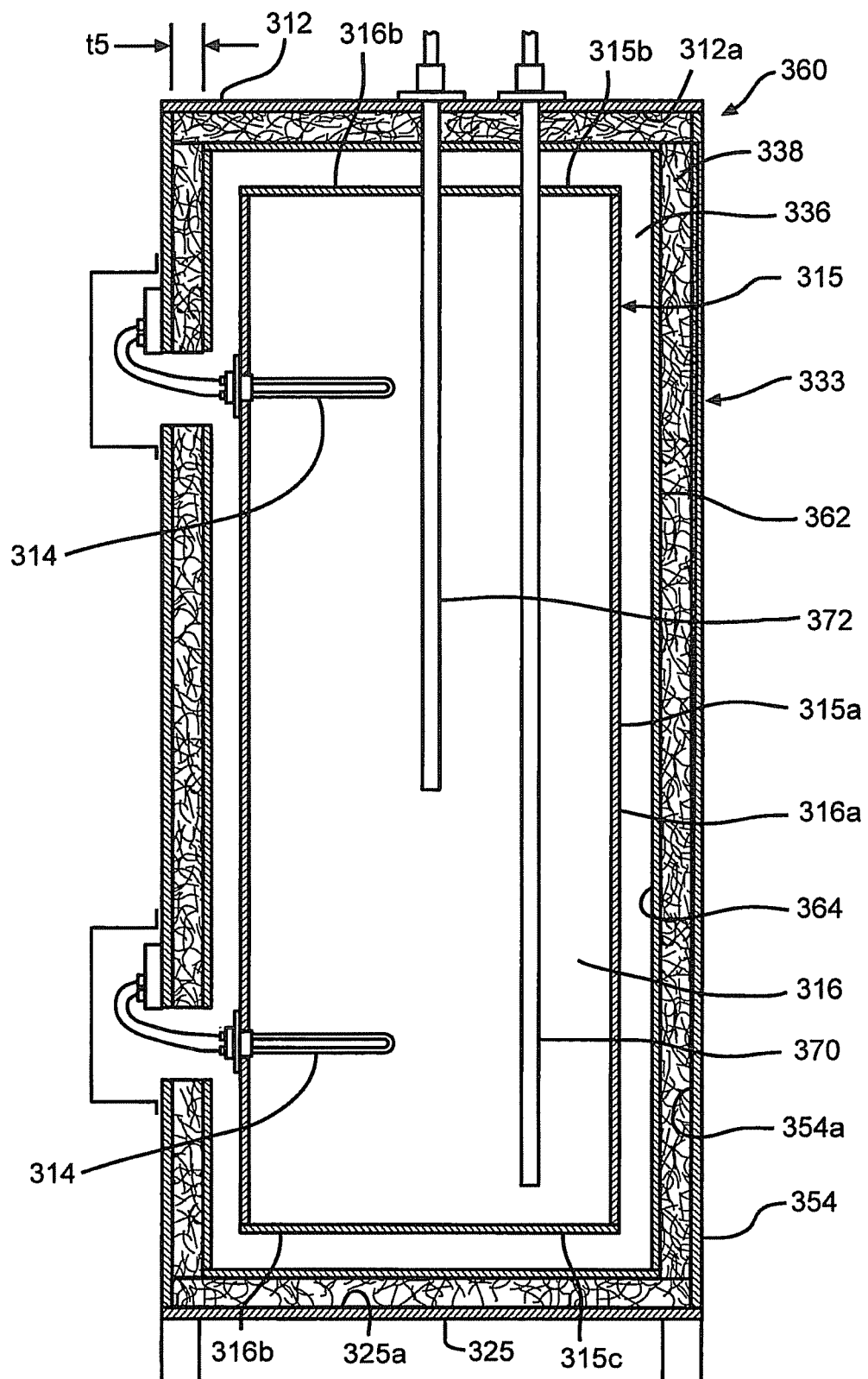
FIG. 8 is a cross-sectional front view in elevation of an improved thermal hot water heater.

In another embodiment, the insulation system can be applied to a different thermal appliance, such as for example a hot water heater. Referring now to FIG. 8, there is illustrated an improved thermal hot water heater, indicated generally at 360. As will be explained in detail below, the hot water heater 360 includes an insulation material having a thermal energy reflective facing, wherein the positioning of the insulation material forms an air gap between the hot water tank 315 and the facing of the insulation material.

As shown in FIG. 8, the hot water heater 360 includes a top 312, a bottom 325 and a continuous outer wall 354. The top 312, bottom 325 and continuous outer wall 354 are configured to form an outer case 333.

The hot water heater 360 includes a cold water inlet pipe 370 and a hot water exit pipe 372. The hot water heater 360 further includes a plurality of heat sources 314 configured to heat water contained within a water tank 315. The hot water tank 315 includes a continuous wall 315a, a tank top 315b, and a tank bottom 315c. The continuous wall 315a, tank top 315b, and tank bottom 315c are configured to define the tank cavity 316. The continuous tank wall 315a has an outer surface 316a. In a similar manner, the tank top 315b and the tank bottom 315c have outer surfaces 316b and 316c, respectfully.

The tank 315 is supported by the outer case 333. The continuous outer wall 354 has an interior surface 354a. Similarly, the tank bottom 325 and the tank top 312 have interior surfaces 325a and 312a, respectfully.

As further shown in FIG. 8, the thermal hot water heater 360 includes a layer of fibrous insulation material 338. The fibrous insulation material 338 is the same as the fibrous insulation material 38 as described previously. The fibrous insulation material 338 is positioned between the outer surfaces 316a, 316b, and 316c of the continuous tank wall 315a, tank top 315b and tank bottom 315c and the interior surfaces 312a, 354a, and 325a of the tank top 312, tank continuous outer wall 354 and tank bottom 325 respectfully. The fibrous insulation material 338 is held in place by the same methods as previously discussed. As shown in FIG. 8, the fibrous insulation material 338 is a single layer. Alternatively, the fibrous insulation material 338 could include more than one layer of fibrous insulation.

As shown in FIG. 8, the fibrous insulation material 338 includes a thermal energy reflective facing 362. The thermal energy reflective facing 362 is the same as the thermal energy reflective facing 62 as previously described. The facing 362 has an interior surface 364.

As further shown in FIG. 8, an air gap 336 is formed between the interior surface 364 of the facing 362 of the insulation material 338 and the tank 315. The air gap 336 is used as a further insulator to limit the conductive heat transfer between the tank 315 and the outer case 333. The use of the air gap 336 supplements the insulation material 338 to minimize the surface temperatures on the outer surfaces of the outer case 333. As shown in FIG. 8, the air gap 336 has a thickness t5. In this embodiment, the thickness t5 is in a range from about 0.50 inches (1.27 cm) to about 1.5 inches (3.81 cm). In another embodiment, the thickness t5 can be less than 0.50 inches (1.27 cm) or more than 1.5 inches (3.81 cm).

During normal heating operation, the hot water heater 360 will heat water within the tank cavity 316 to a temperature range from about 100° F. (37° C.) to about 180° F. (82° C.). The heat from within the tank cavity 316 radiates from the tank cavity 316, through the air gap 336, and reflects against the thermal energy reflective facing 362 of the insulation material 338. In this manner, the air gap 336, the insulation material 338 and the facing 362 cooperate to limit the amount of heat that is transferred to the outer case 333.

While the hot water heater 360 shown in FIG. 8 is an electric hot water heater, it is to be understood that the illustrated insulation system can be applied to a different type of hot water heater, such as for example a gas hot water heater.

Figure 9:
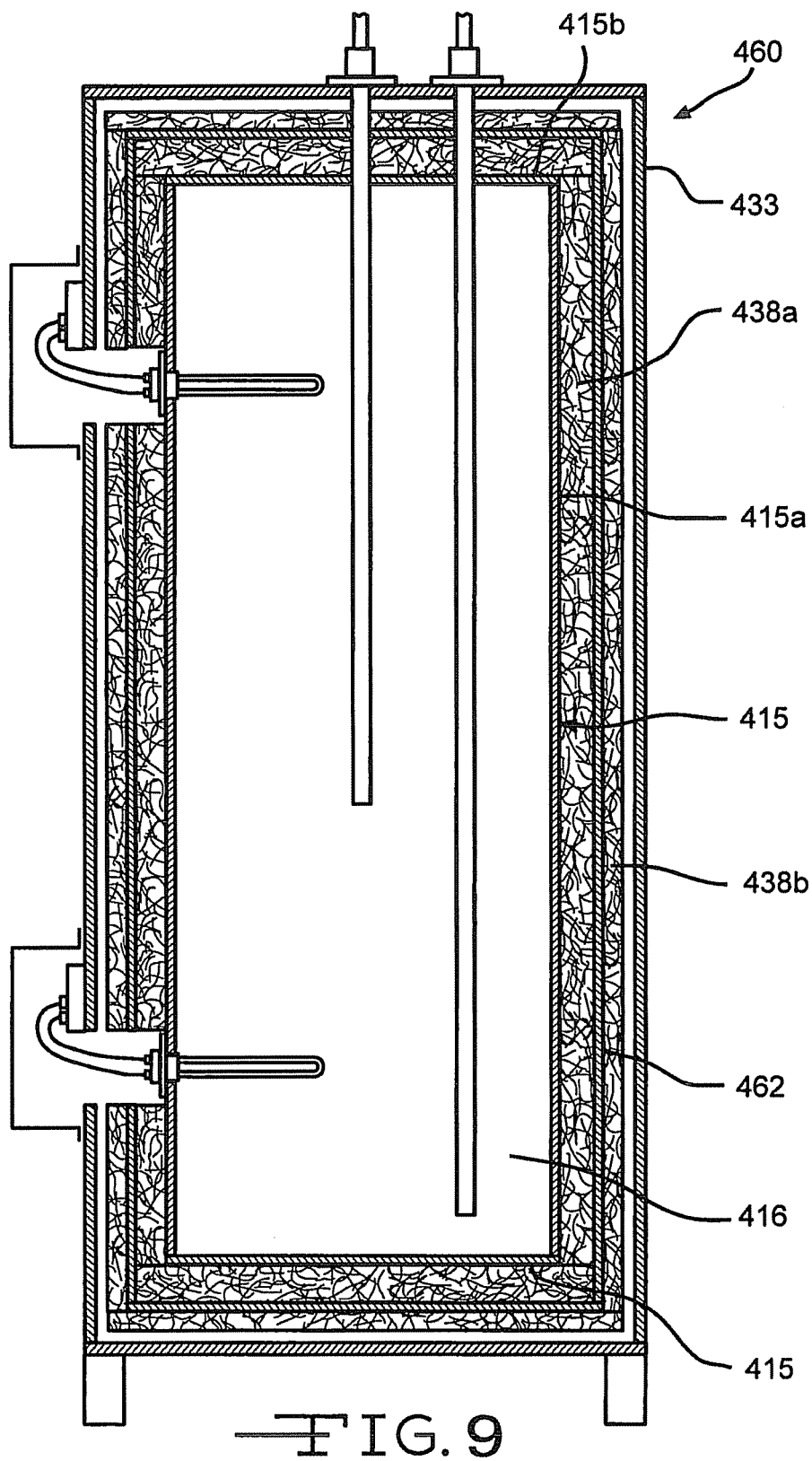
FIG. 9 is a cross-sectional side view in elevation of the improved thermal hot water heater of FIG. 8.

In another embodiment of the improved hot water heater 460, as shown in FIG. 9, the air gap is eliminated and an inner insulation material 438a is positioned in contact with outside surfaces 415a, 415b, and 415c of the tank 415. The inner insulation material 438a is the same insulation as the insulation material 238a previously described. An outer insulation material 438b is positioned adjacent to the inner insulation material 438a. The outer insulation material 438b is the same insulation as the insulation material 238b previously described.

As further shown in FIG. 9, the outer insulation d38b has a thermal energy reflective facing 462. The facing 462 is positioned between the inner insulation material 438a and the outer insulation material 438b. In this embodiment, the thermal energy reflective facing 462 is the same as the facing 62 described above.

During normal heating operation, the improved hot water heater 460 will heat the water within a tank cavity 416. The heat from within the tank cavity 416 radiates from the tank cavity 416, through the inner insulation material 438a, and reflects against the thermal energy reflective facing 462 of the outer insulation material 438b. In this manner, the inner insulation material 438a, the outer insulation material 438b and the facing 462 cooperate to limit the amount of heat that is transferred to an outer case 433.

While the hot water heater 460 shown in FIG. 9 is an electric hot water heater, it is to be understood that the illustrated insulation system can be applied to a different type of hot water heater, such as for example a gas hot water heater.

The principle and mode of operation of this invention have been described in its preferred embodiments. However, it should be noted that this invention may be practiced otherwise than as specifically illustrated and described without departing from its scope.

What is claimed is:

1. A thermal appliance configured to operate at a temperature of at least 500° F. comprising:
    an outer cabinet;
    a liner that defines an oven cavity positioned within the outer cabinet;
    fibrous insulation material that engages an outside surface of the liner and is transparent to radiation in the range of 0.1 microns to 100 microns; and
    an air gap provided between the fibrous insulation material and the outer cabinet, wherein a thickness of the air gap is less than a thickness of the fibrous insulation material,
    wherein the air gap is continuous, such that the fibrous insulation material does not touch the outer cabinet.

2. The thermal appliance of claim 1, wherein the thermal appliance is an oven.

3. An oven configured to operate at a temperature of at least 500° F. comprising:
    an outer cabinet;
    a liner that defines an oven cavity positioned within the outer cabinet;
    an inner layer of fibrous insulation material that engages an outside surface of the liner, the inner layer having a first density and configured to reduce convective heat transfer without having a substantial effect on radiant heat transfer, wherein the inner layer is made from glass fibers, mineral wool, or rock wool and is transparent to radiation in the range of 0.1 microns to 100 microns;
    a thermal energy metallic foil reflective layer that engages the inner layer, wherein the thermal energy reflective layer is configured to reflect radiant heat transfer;
    an outer layer of fibrous insulation material disposed around the thermal energy reflective layer, the outer layer having a second density that is greater than the first density of the inner layer, wherein the outer layer is made from glass fibers, mineral wool, or rock wool; and
    an air gap provided between the outer layer and the outer cabinet,
    wherein the outer cabinet has a maximum surface temperature below 152° F. for a painted metal surface, below 160° F. for a porcelain enamel surface, or below 172° F. for a glass surface during operation of the oven.

4. The oven of claim 3, wherein the inner layer has a thickness in the range of from 0.5 inch to 1.5 inches.

5. The oven of claim 4, wherein the outer layer has a thickness in the range of from 0.5 inch to 1.5 inches.

6. The oven of claim 3, wherein the inner layer has a thickness in the range of from 0.5 inch to 1.5 inches, and wherein the outer layer has a thickness in the range of from 0.5 inch to 1.5 inches.

7. The oven of claim 3, wherein the air gap is continuous, such that the outer layer does not touch the outer cabinet.

8. The oven of claim 7, wherein a thickness of the inner layer is less than a thickness of the outer layer.

9. The oven of claim 7, wherein a thickness of the outer layer is less than a thickness of the inner layer.

10. The oven of claim 3, wherein the oven is operated at 250° F. to 500° F.

11. The oven of claim 3, wherein the oven is operated at 750° F. to 900° F.

12. An oven configured to operate at a temperature of at least 500° F. comprising:
   an outer cabinet;
   a liner that defines an oven cavity positioned within the outer cabinet an;
   an inner layer of fibrous insulation material that engages the outside surface of the liner, the inner layer having a first density, wherein the inner layer is made from glass fibers, mineral wool, or rock wool and is transparent to radiation in the range of 0.1 microns to 100 microns;
   an outer layer of fibrous insulation material disposed around the inner layer, the outer layer having a second density that is different than the first density of the inner layer, wherein the outer layer is made from glass fibers, mineral wool, or rock wool; and
   an air gap provided between the outer layer and the outer cabinet,
   wherein the air gap is continuous, such that the outer layer does not touch the outer cabinet, and
   wherein the outer cabinet has a maximum surface temperature below 152° F. for a painted metal surface, below 160° F. for a porcelain enamel surface, or below 172° F. for a glass surface during operation of the oven.

13. The oven of claim 12, wherein the first density is lower than the second density.

14. The oven of claim 12, wherein a thickness of the outer layer is less than a thickness of the inner layer.

15. The oven of claim 12, wherein a thickness of the inner layer is less than a thickness of the outer layer.

16. The oven of claim 12, wherein the oven is operated at 250° F. to 500° F.

17. The oven of claim 12, wherein the oven is operated at 750° F. to 900° F.

* * * * *